United States Patent
Yoshioka et al.

(10) Patent No.: US 12,464,531 B2
(45) Date of Patent: Nov. 4, 2025

(54) USER EQUIPMENT

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 324 days.

(21) Appl. No.: 17/598,564

(22) PCT Filed: Apr. 2, 2019

(86) PCT No.: PCT/JP2019/014708
§ 371 (c)(1),
(2) Date: Sep. 27, 2021

(87) PCT Pub. No.: WO2020/202480
PCT Pub. Date: Oct. 8, 2020

(65) Prior Publication Data
US 2022/0201741 A1    Jun. 23, 2022

(51) Int. Cl.
| H04W 4/00 | (2018.01) |
| H04W 72/02 | (2009.01) |
| H04W 72/0446 | (2023.01) |
| H04W 72/20 | (2023.01) |
| H04W 72/23 | (2023.01) |

(52) U.S. Cl.
CPC ........... *H04W 72/23* (2023.01); *H04W 72/02* (2013.01); *H04W 72/0446* (2013.01); *H04W 72/20* (2023.01)

(58) Field of Classification Search
None
See application file for complete search history.

(56) References Cited

U.S. PATENT DOCUMENTS

| 2014/0023008 A1 | 1/2014 | Ahn et al. |
| 2019/0116609 A1* | 4/2019 | Feng ..................... H04W 72/23 |
| 2020/0053835 A1* | 2/2020 | Ye ......................... H04L 1/0061 |
| 2020/0205166 A1* | 6/2020 | Huang ................. H04W 76/27 |
| 2020/0314889 A1* | 10/2020 | Cirik ..................... H04W 72/23 |
| 2023/0292183 A1* | 9/2023 | Park .................. H04W 36/0005 |
|  |  | 81/53.2 |

FOREIGN PATENT DOCUMENTS

| EP | 3437402 A1 | 2/2019 |
| WO | 2016181095 A1 | 11/2016 |
| WO | 2017011106 A1 | 1/2017 |

(Continued)

OTHER PUBLICATIONS

International Search Report issued in PCT/JP2019/014708 on Jul. 2, 2019 (3 pages).

(Continued)

*Primary Examiner* — Zewdu A Beyen
(74) *Attorney, Agent, or Firm* — Osha Bergman Watanabe & Burton LLP

(57) ABSTRACT

A user equipment including: a reception unit that receives configuration information for one or more grants from a base station apparatus; and a transmission unit that, wherein the one or more grants are active, transmits a sidelink signal using a resource specified by the one or more grants.

6 Claims, 9 Drawing Sheets

(56) References Cited

FOREIGN PATENT DOCUMENTS

| WO | 2017/166260 A1 | 10/2017 |
| WO | 2017/194212 A1 | 11/2017 |

OTHER PUBLICATIONS

Written Opinion of the International Searching Authority issued in PCT/JP2019/014708 on Jul. 2, 2019 (3 pages).

3GPP TS 36.211 V15.4.0; "3rd Generation Partnership Project; Technical Specification Group Radio Access Network; Evolved Universal Terrestrial Radio Access (E-UTRA); Physical channesl and modulation (Release 15)"; Dec. 2018 (240 pages).

3GPP TS 38.321 V15.4.0; "3rd Generation Partnership Project; Technical Specification Group Radio Access Network; NR; Medium Access Control (MAC) protocol specification (Release 15)"; Dec. 2018 (77 pages).

Extended European Search Report issued in European Application No. 19923383.4 mailed on Sep. 26, 2022 (9 pages).

Office Action issued in counterpart Japanese Patent Application No. 2021-511840 mailed on Nov. 14, 2023 (5 pages).

Spreadtrum Communications; "Consideration on NR Uu-based sidelink resource allocation"; 3GPP TSG RAN WG1 Ad-Hoc Meeting 1901, R1-1900715; Taipei; Jan. 21-25, 2019 (3 pages).

Panasonic; "Discussion on URLLC enhancements for grant-free transmission"; 3GPP TSG RAN WG1 #96, R1-1902396; Athens, Greece; Feb. 25-Mar. 1, 2019 (8 pages).

Office Action issued in Korean Application No. 10-2021-7032702, dated Jun. 21, 2024 (11 pages).

3GPP TSG-RAN WG2 Meeting #105bis; R2-1903632; vivo; "Sidelink Configured Grant in NR V2X"; Xi'an, China, Apr. 8-12, 2019 (3 pages).

3GPP TSG RAN WG2 Meeting #105bis; R2-1903626; ZTE, Sanechips; "Consideration on NR V2X mode 1 resource allocation"; Xi'an, China, Apr. 8-12, 2019 (4 pages).

Office Action issued in European Patent Application No. 19923383.4 mailed on Jan. 14, 2025 (7 pages).

ITRI; "Considering on NR Uu for Resource Configuration on NR sidelink"; 3GPP TSG RAN WG1 Meeting #95, R1-1813105; Spokane, USA; Nov. 12-16, 2018 (8 pages).

Huawei, HiSilicon; "Discussion on Uu-based sidelink resource allocation/configuration"; 3GPP TSG RAN WG1 Ad-Hoc Meeting 1901, R1-1900028; Taipei; Jan. 21-25, 2019 (13 pages).

Office Action issued in counterpart Korean Patent Application No. 10-2021-7032702 mailed on Mar. 4, 2025 (7 pages).

\* cited by examiner

USER EQUIPMENT

TECHNICAL FIELD

The present invention relates to a user equipment in a wireless communication system.

BACKGROUND ART

In LTE (Long Term Evolution) and LTE successor systems (e.g., LTE-A (LTE Advanced), NR (New Radio) (5G)), a D2D (Device to Device) technology in which user equipments communicate directly with each other without using a base station apparatus is under consideration (e.g., Non-Patent Document 1).

The D2D reduces traffic between the user equipment and the base station apparatus and enables communication between the user equipments even when the base station apparatus is unable to communicate during a disaster, etc. In the 3rd Generation Partnership Project (3rd GPP), D2D is called "sidelink".

D2D communication is broadly classified into D2D discovery (D2D discovery) for discovering other user equipments capable of communication and D2D communication (D2D direct communication, D2D communication, terminal-to-terminal direct communication, etc.) for communicating directly between user equipments. Hereinafter, when D2D communication, D2D discovery, etc. are not specifically distinguished, it is simply called D2D. Various use cases of V2X (Vehicle to Everything) services in NR are under consideration.

PRIOR ART DOCUMENTS

Non-Patent Documents

[Non-Patent Document 1] 3GPP TS 36.211 V15.4.0(2018-12)
[Non-Patent Document 2] 3GPP TS 38.321 V15.4.0(2018-12)

SUMMARY OF INVENTION

Problem to be Solved by the Invention

It has been proposed (e.g., Non-Patent Document 2) that a configured grant allows a user equipment to perform UL data transmission without receiving PDCCH every time PDCCH UL data transmission is performed. Also, for UL data transmission of user equipment, it is considered to support multiple active configured grants based on the assumption that different services require different resource configurations.

However, no specific technology has been proposed for supporting multiple active configured grants for sidelink.

The present invention has been made in view of, at least, the foregoing, and is intended to provide a technique for providing support for multiple active configured grants in sidelink.

Means for Solving Problems

According to the disclosed technique, there is provided a user equipment including:
 a reception unit that receives configuration information for one or more grants from a base station apparatus; and
 a transmission unit that, wherein the one or more grants are active, transmits a sidelink signal using a resource specified by the one or more grants.

Effects of the Invention

According to the disclosed technique, a technique for providing support for multiple active configured grants is provided in sidelink.

MODE FOR CARRYING OUT THE INVENTION

Hereinafter, an embodiment of the invention will be described with reference to the diagrams. In addition, the embodiment described below is an example, and the embodiment to which the invention is applied is not limited to the following embodiment.

In the actual operation of a radio communication system according to the embodiment of the invention, known technology may be appropriately used. The known technology is, for example, known LTE or NR, but is not limited to the known LTE or NR.

In addition, in the embodiment of the invention, a duplex system may be a Time Division Duplex (TDD) system, a Frequency Division Duplex (FDD) system, or any other system (for example, Flexible Duplex).

Figure 1:
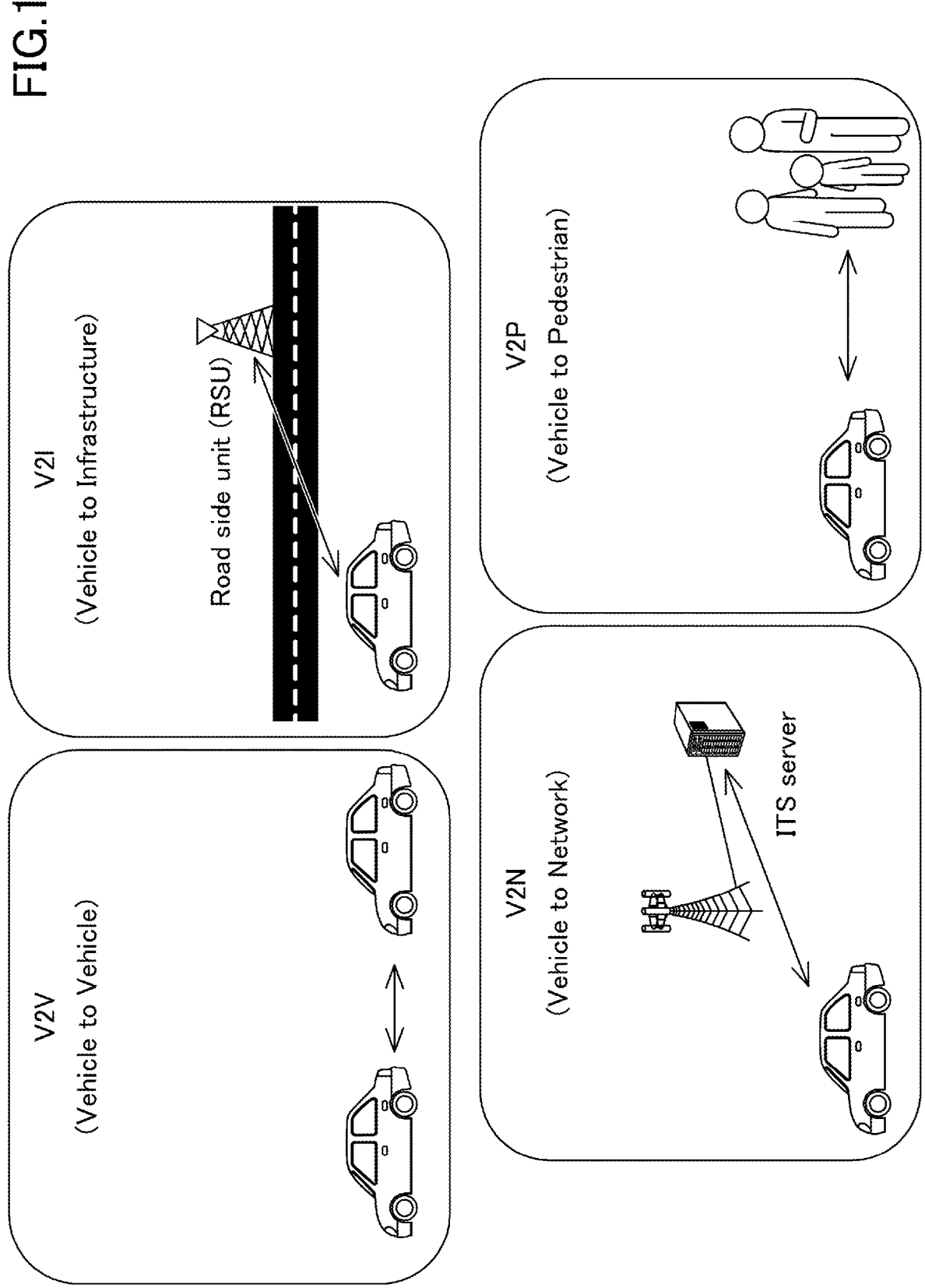
FIG. 1 is a diagram for explaining V2X.

FIG. 1 is a diagram for describing V2X. In 3GPP, realizing Vehicle to Everything (V2X) or enhanced V2X (eV2X) by expanding the D2D function has been studied, and the specification is underway. As illustrated in FIG. 1, V2X is a part of Intelligent Transport Systems (ITS), and is a general term for Vehicle to Vehicle (V2V) that means a form of communication performed between vehicles, Vehicle to Infrastructure (V2I) that means a form of communication performed between a vehicle and a road-side unit (RSU)

installed on the side of the road, Vehicle to Network (V2N) that means a form of communication performed between a vehicle and an ITS server, and Vehicle to Pedestrian (V2P) that means a form of communication performed between a vehicle and a mobile terminal carried by a pedestrian.

In addition, in 3GPP, V2X using cellular communication and terminal-to-terminal communication in LTE or NR has been studied. V2X using cellular communication is also referred to as cellular V2X. In V2X of NR, studies for realizing large capacity, low delay, high reliability, and Quality of Service (QoS) control are under way.

It is assumed that studies on V2X of LTE or NR, which are not limited to the 3GPP specifications, will be made in the future. For example, it is assumed that ensuring interoperability, reducing costs by implementation of higher layers, how to use or switch multiple Radio Access Technologies (RATs), supporting regulations in each country, data acquisition and distribution of V2X platform of LTE or NR, and database management and usage methods will be studied.

In the embodiment of the invention, a form in which a communication device, such as user equipment (UE), is mounted on a vehicle is mainly assumed, but the embodiment of the invention is not limited to this form. For example, the communication device may be a terminal held by a person, or the communication device may be a device mounted on a drone or an aircraft.

In addition, Sidelink (SL) may be distinguished from Uplink (UL) or Downlink (DL) based on any one or combination of the following 1) to 4). In addition, SL may be another name.

1) Resource allocation in time domain.

2) Resource allocation in frequency domain.

3) Synchronization signal to be referred to (including Sidelink Synchronization Signal (SLSS)).

4) Reference signal used for path loss measurement for transmission power control.

In addition, for Orthogonal Frequency Division Multiplexing (OFDM) of SL or UL, any of Cyclic-Prefix OFDM (CP-OFDM), Discrete Fourier Transform-Spread-OFDM (DFT-S-OFDM), OFDM that is not subjected to Transform precoding, and OFDM that is subjected to Transform precoding may be applied.

Figure 2:
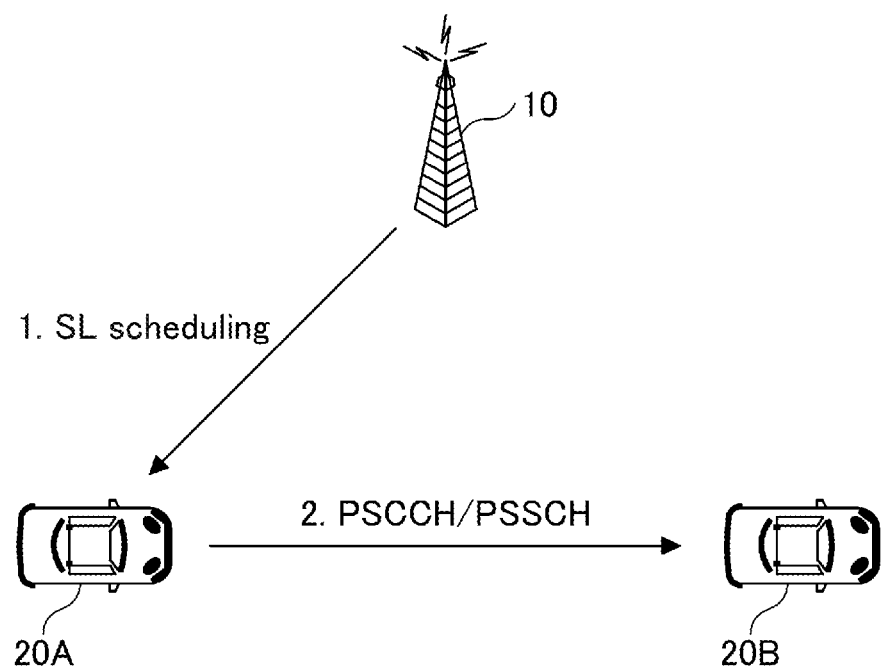
FIG. 2 is a diagram for explaining an example (1) of a transmission mode of V2X.

The radio communication system according to the present embodiment includes a base station apparatus 10 and a user equipment 20, as illustrated in FIG. 2 and the like. For the user equipment 20, a plurality of pieces of user equipments 20 that perform sidelink communication therebetween are described as a user equipment 20A, a user equipment 20B, and the like.

The base station apparatus 10 is a communication device that provides one or more cells and performs radio communication with the user equipment 20. The physical resource of a radio signal is defined in a time domain and a frequency domain, and the time domain may be defined by the number of OFDM symbols, and the frequency domain may be defined by the number of subcarriers or the number of resource blocks. In addition, a Transmission Time Interval (TTI) in the time domain may be a slot, or the TTI may be a subframe.

The base station apparatus 10 transmits a synchronization signal and system information to the user equipment 20. The synchronization signal is, for example, PSS and SSS. The system information is transmitted through, for example, a PBCH or a PDSCH, and is also referred to as broadcast information. The base station apparatus 10 transmits a control signal or data to the user equipment 20 by Downlink (DL), and receives a control signal or data from the user equipment 20 by Uplink (UL). In addition, here, a signal transmitted through a control channel, such as a PUCCH or a PDCCH, is called a control signal, and a signal transmitted through a shared channel, such as a PUSCH or a PDSCH, is called data. However, such naming is an example. For example, the control signal and the data may be collectively called a "signal".

The user equipment 20 is a communication device having a radio communication function, such as a smartphone, a mobile phone, a tablet, a wearable terminal, and a communication module for Machine-to-Machine (M2M). In addition, for example, as described above, the user equipment 20 is a communication device mounted on a vehicle.

The user equipment 20 uses various communication services provided by the radio communication system by receiving a control signal or data from the base station apparatus 10 by DL and transmitting a control signal or data to the base station apparatus 10 by UL. In addition, the user equipment 20 may be called a UE, and the base station apparatus 10 may be called an eNB (or a gNB).

In the SL of LTE, Mode3 and Mode4 are specified for allocating SL resources to the user equipment 20. In Mode3, transmitting resources are dynamically allocated by a DCI (Downlink Control Information) transmitted from the base station apparatus 10 to the user equipment 20. In Mode3, SPS (Semi Persistent Scheduling) is also possible. In Mode4, the user equipment 20 autonomously selects transmit resources from a resource pool.

In addition, a slot in the embodiment of the invention may be replaced with a symbol, a mini-slot, a subframe, a radio frame, and a Transmission Time Interval (TTI). In addition, a cell in the embodiment of the invention may be replaced with a cell group, a carrier component, a BWP, a resource pool, a resource, a Radio Access Technology (RAT), a system (including a wireless LAN), and the like.

FIG. 2 is a diagram for describing an example (1) of a V2X transmission mode. In the transmission mode of the sidelink communication illustrated in FIG. 2, in step 1, the base station apparatus 10 transmits scheduling information of the sidelink to the user equipment 20A. Then, the user equipment 20A transmits a Physical Sidelink Control Channel (PSCCH) and a Physical Sidelink Shared Channel (PSSCH) to the user equipment 20B based on the received scheduling information (step 2). The transmission mode of the sidelink communication illustrated in FIG. 2 may be called sidelink transmission mode 3 in LTE. In sidelink transmission mode 3 in LTE, Uu-based sidelink scheduling is performed. Uu is a radio interface between Universal Terrestrial Radio Access Network (UTRAN) and User Equipment (UE). The transmission mode of the sidelink communication illustrated in FIG. 2 may be called sidelink transmission mode 1 in the NR. In this case, the above-described Uu becomes NR-Uu, which is a radio interface between the NR and the UE.

Figure 3:
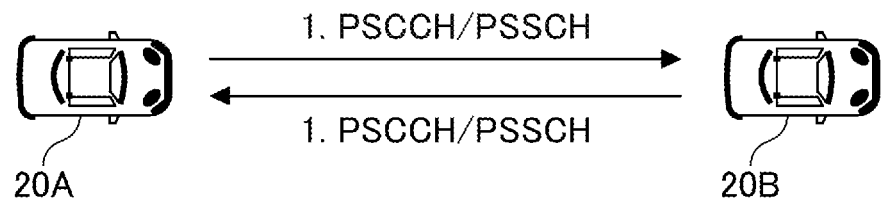
FIG. 3 is a diagram for explaining an example (2) of a transmission mode of V2X.

FIG. 3 is a diagram for describing an example (2) of the V2X transmission mode. In the transmission mode of the sidelink communication illustrated in FIG. 3, in step 1, the user equipment 20A transmits the PSCCH and the PSSCH to the user equipment 20B using the autonomously selected resource. Similarly, the user equipment 20B transmits the PSCCH and the PSSCH to the user equipment 20A using the autonomously selected resource (step 1). The transmission mode of the sidelink communication illustrated in FIG. 3 may be called sidelink transmission mode 2a in the NR. In the sidelink transmission mode 2a in the NR, the UE itself performs resource selection.

In the sidelink transmission mode 2a, the user equipment 20 on the transmission side performs sensing and selects a free SL resource. The sensing procedure may be executed by decoding Sidelink Control Information (SCI) transmitted from another user equipment 20, or may be executed based on received power by sidelink measurement. Sidelink Feedback Control Information (SFCI) transmitted through a Physical Sidelink Feedback Channel (PSFCH) may be used in the sensing procedure. A resource selection procedure for determining resources used for sidelink transmission is executed based on a result of the sensing procedure.

In addition, the granularity of resources applied to the sensing procedure and the resource selection procedure may be defined in PRB units, slot units, and other resource pattern units. By decoding the SCI applied to the sensing procedure, at least information regarding the sidelink resource notified by the user equipment 20 that transmits the SCI is acquired.

Figure 4:
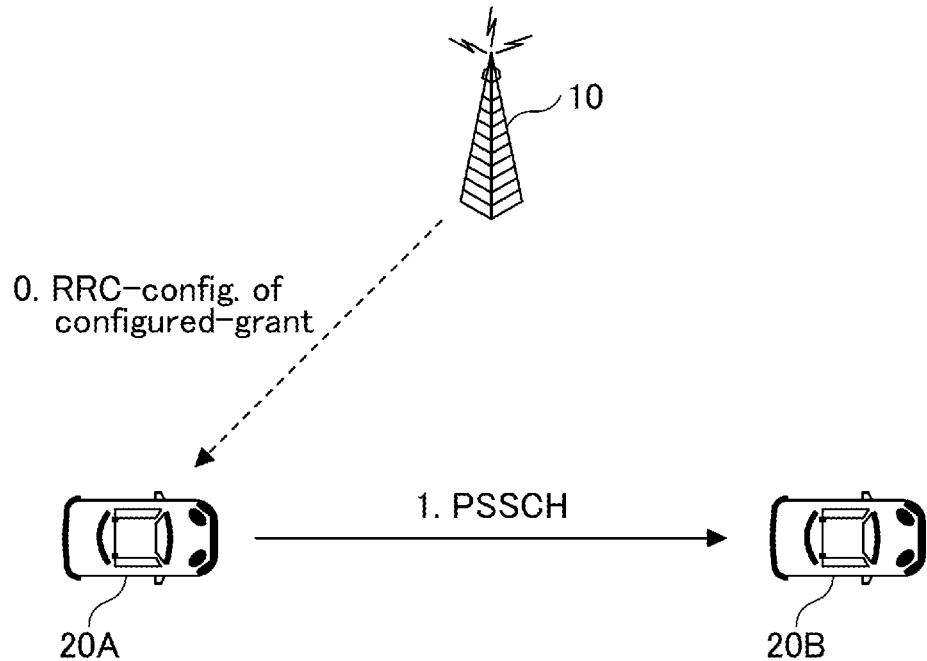
FIG. 4 is a diagram for explaining an example (3) of a transmission mode of V2X.

FIG. 4 is a diagram for describing an example (3) of the V2X transmission mode. In the transmission mode of the sidelink communication illustrated in FIG. 4, in step 0, the base station apparatus 10 transmits scheduling grant of the sidelink to the user equipment 20A through Radio Resource Control (RRC) configuration. Subsequently, the user equipment 20A transmits the PSSCH to the user equipment 20B based on the received scheduling grant (step 1). The transmission mode of the sidelink communication illustrated in FIG. 4 may be called sidelink transmission mode 2c in the NR.

Figure 5:
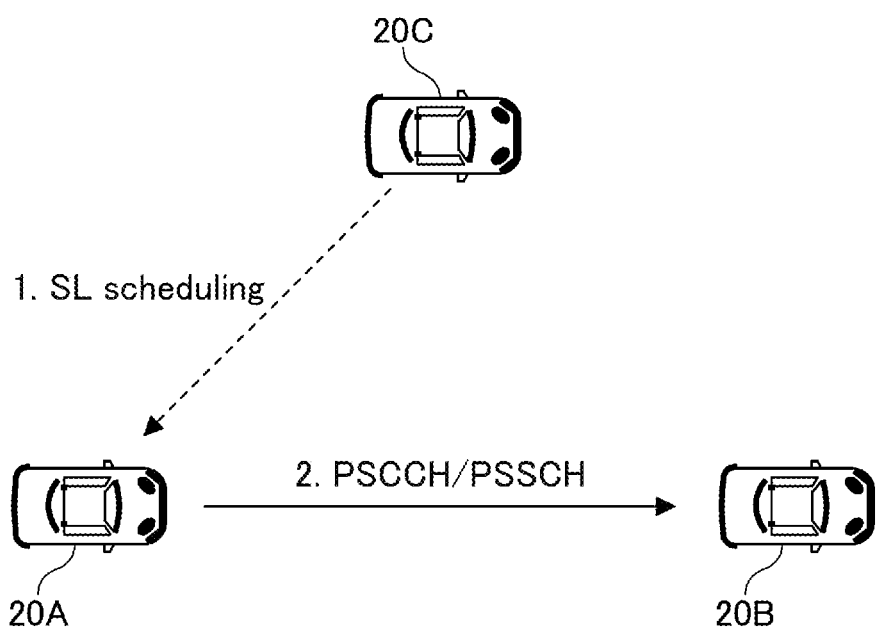
FIG. 5 is a diagram for explaining an example (4) of a transmission mode of V2X.

FIG. 5 is a diagram for describing an example (4) of the V2X transmission mode. In the transmission mode of the sidelink communication illustrated in FIG. 5, in step 1, user equipment 20C transmits scheduling information of the sidelink to the user equipment 20A through the PSCCH. Subsequently, the user equipment 20A transmits the PSCCH and the PSSCH to the user equipment 20A based on the received scheduling information (step 2). The transmission mode of the sidelink communication illustrated in FIG. 5 may be called sidelink transmission mode 2d in the NR. Note that "transmitting the PSCCH" may be rephrased as transmitting control information using the PSCCH. In addition, "transmitting the PSCCH" may be rephrased as transmitting control information using the PSCCH.

Figure 6:
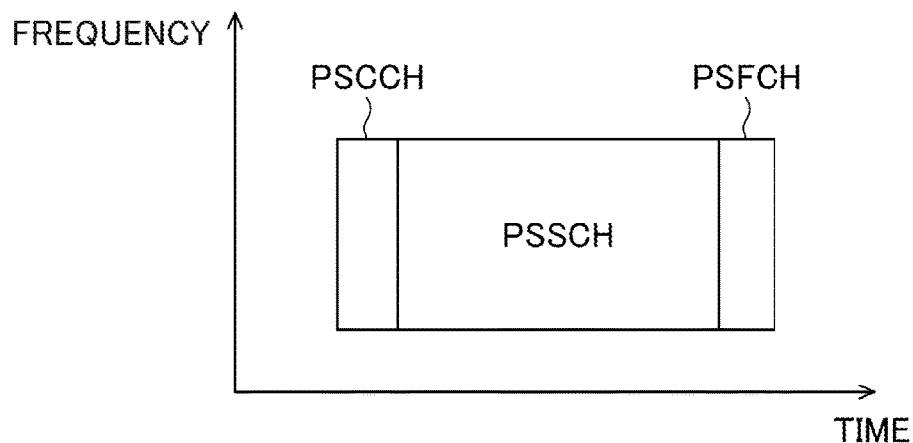
FIG. 6 is a diagram showing an example of a channel configuration.

FIG. 6 is an example of a sidelink channel configuration, in which a PSCCH, a PSSCH, and a PSFCH are arranged in order in the time domain. Note that, arrangement of the PSCCH, the PSSCH, and the PSFCH is not limited to FIG. 6, and they may be frequency domain multiplexed. For example, the PSCCH and the PSSCH may be arranged adjacent to each other in the frequency domain, and the transmission of the SCI through the PSCCH and the transmission of the data through the PSSCH may be performed simultaneously (for example, in one subframe).

(For Configured Grant)

In this embodiment, an operation example based on the configured grant in SL will be described. Therefore, first of all, a configured grant will be described. Generally, the "grant" is a signal transmitted from one communication device (for convenience, referred to as the "communication device A") to another communication device (referred to as the "communication device B") and is a signal for allowing a signal to be transmitted to the communication device B. The grant contains information on resources (time and frequency resources) to be used by the communication device B for signal transmission.

The grant includes a grant that is transmitted through a PDCCH or the like to dynamically permit transmission and a configured grant that is configured in advance by RRC signaling or the like. When a configured grant (including a time resource (or time and frequency resources), a period, and the like) is configured from a communication device A to a communication device B, for example, the communication device B performs signal transmission using the resource specified by the configured grant at a period specified by the configured grant. In addition, the communication device A may perform monitoring for signal reception using the resource specified by the configured grant at the period specified by the configured grant.

The communication device B in which the configured grant is configured does not need to receive a grant every time transmission is performed. Hereinafter, the configured grant may be described as "CG".

As CG, there are a type 1 CG and a type 2 CG. In the type 1, CG configuration includes a resource (which may be a time resource or may be time and frequency resources) and a parameter (for example, an RRC parameter) for specifying a period. In the communication device B in which the type 1 CG is configured, the CG is always active. The communication device B can perform data transmission using the periodic resource without receiving signaling by the PDCCH/PSCCH. In addition, the communication device B may skip the transmission.

Also in the type 2, CG configuration includes a resource (which may be a time resource or may be time and frequency resources) and a parameter (for example, an RRC parameter) for specifying a period. In the communication device B in which the type 2 CG is configured, the CG is not active at the stage where CG configuration is just made. After receiving an activation command by DCI/SCI transmitted through the PDCCH/PSCCH, the communication device B can perform data transmission using the periodic resource. In addition, the communication device B may skip the transmission. When the communication device B receives a deactivation command by DCI/SCI, the CG becomes inactive.

By using the above-described CG, since it is not necessary to receive PDCCH for every transmission, waste of PDCCH resources can be avoided and delay can be reduced.

(On Multiple CGs)

In the communication system of this embodiment, a plurality of active CGs may be supported. For example, multiple CGs are supported between different types of services because different resource configurations are assumed.

For example, when type 1 CG1 and type 1 CG2 are configured from the base station apparatus 10 to the user equipment 20, the user equipment 20 can transmit data in a resource and a cycle designated by CG1 and transmit data in a resource and a cycle designated by CG2. Multiple CGs of type 2 may also be supported.

While the above example of multiple CGs is an example in Uu (communication between base station apparatus 10 and user equipment 20), type 1 and type 2 multiple CGs may also be supported in sidelink (hereinafter referred to as SL).

Hereinafter, detailed examples of operation of multiple CGs in the sidelink will be described with reference to Examples 1 to 2. Examples 1-2 assume application to NR-SL, but application of Examples 1-2 is not limited to NR-SL. Examples 1-2 may be applied to SL of LTE or SL (or D2D) in a communication system other than the NR and the LTE.

Example 1

Example 1 is an example in which multiple CGs of type 1 are configured to the user equipment 20. Example 1 is divided into Examples 1-1 and 1-2. Example 1-1 describes resource allocation mode 1, and Example 1-2 describes resource allocation mode 2.

Example 1-1: Resource Allocation Model 1

Figure 7:
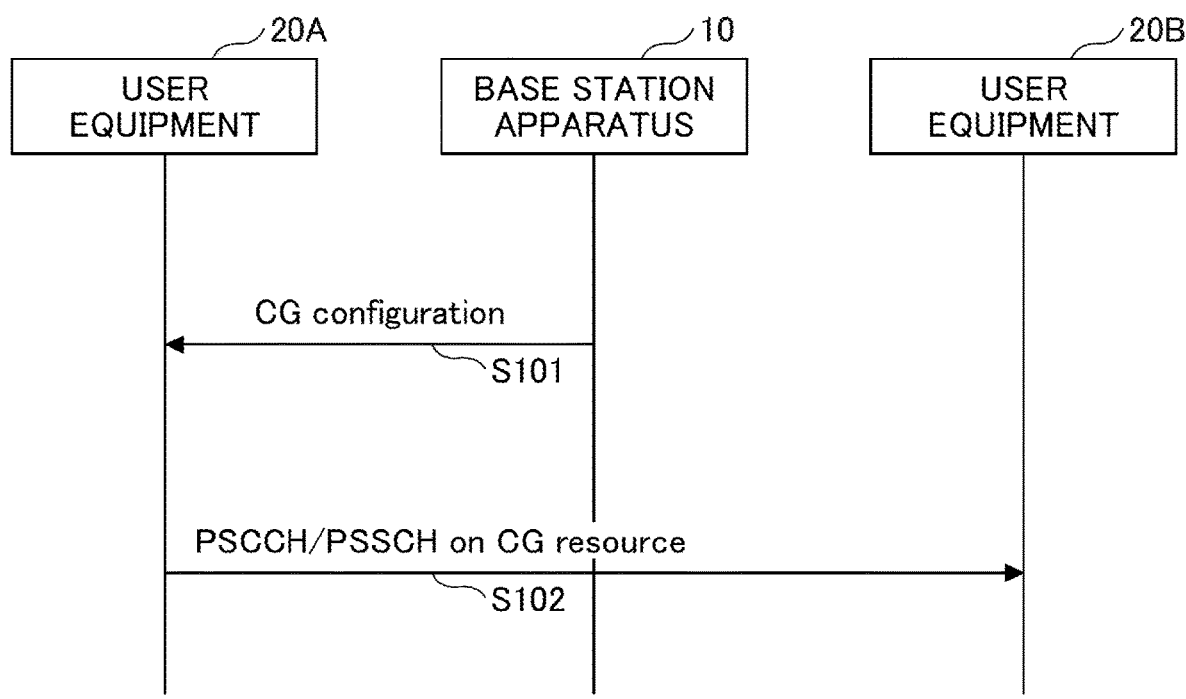
FIG. 7 is a sequence diagram for explaining an operation of Example 1-1.

FIG. 7 is a sequence diagram for explaining Example 1-1. In S101, for example, by RRC signaling (upper layer signaling), one or more CG configuration information (CG configurations) is transmitted from the base station apparatus 10 to the user equipment 20A. The configuration information of each CG includes parameters indicating a resource (time resource, or time and frequency resource) and periodicity (periodicity) that the user equipment 20A can use in SL transmission.

Regarding the configuration information of the plurality of CGs, the configuration information of the plurality of CGs may be notified by one signaling message, or configuration information of one CG may be notified by one signaling message. The same is true for the following examples.

In the user equipment 20A in which RRC configuration of one or more CGs is performed by S101, the one or more CGs are each active. Accordingly, in S102, the user equipment 20A can perform transmission by PSCCH/PSSCH using the resources of each CG. "Transmission by PSCCH/PSSCH" means sending a SCI by PSCCH, sending data by PSSCH, or simultaneously transmitting the SCI by PSCCH and the data by PSSCH.

The user equipment 20B receives data transmitted from the user equipment 20A with a resource specified by the SCI.

In Example 1-1, time resources may overlap among the plurality of CGs configured to the user equipment 20A. Overlapping of time resources corresponds to a case, for example, in which periodic use of subframe 1 is configured by CG1 and periodic use of subframe 1 is configured by CG2. In addition, time and frequency resources may overlap among multiple CGs configured in the user equipment 20A. Overlapping of time resources and overlapping of time and frequency resources are collectively referred to as "overlapping of resources."

When the user equipment 20A detects that the resources are overlapped between the plurality of CGs as described above, the user equipment 20A determines which CG resource to select according to implementation (UE implementation) of the user equipment 20A.

In addition, when the user equipment 20A detects that resources are overlapped between a plurality of CGs as described above, the user equipment 20A may select a single CG resource in accordance with a priority of the CG. In this case, for example, the configuration information of CGs transmitted from the base station apparatus 10 to the user equipment 20 includes information of priorities of the CGs. When the CG2 has a higher priority than the CG1, and when the resources of the CG1 and the CG2 are overlapped, the user equipment 20A selects, for example, the high priority CG2 resource.

In the example shown in FIG. 7, the configuration information transmitted to the user equipment 20A in S101 may be also transmitted to the user equipment 20B, and configuration information of one or more CGs for the user equipment 20A may be configured to the user equipment 20B. Accordingly, the user equipment 20B can understand a resource of data transmitted from the user equipment 20A, so that data can be received by PSSCH without receiving SCI. Accordingly, in this case, the user equipment 20A can transmit only PSSCH without PSCCH (Standalone PSSCH transmission).

In the configuration shown in FIG. 7, the base station apparatus 10 may be replaced with a user equipment 20C. In this case, the user equipment 20C transmits configuration information of one or more CGs to the user equipment 20A by RRC signaling of sidelink (PC5-RRC).

Example 1-2: Resource Allocation Mode 2

Figure 8:
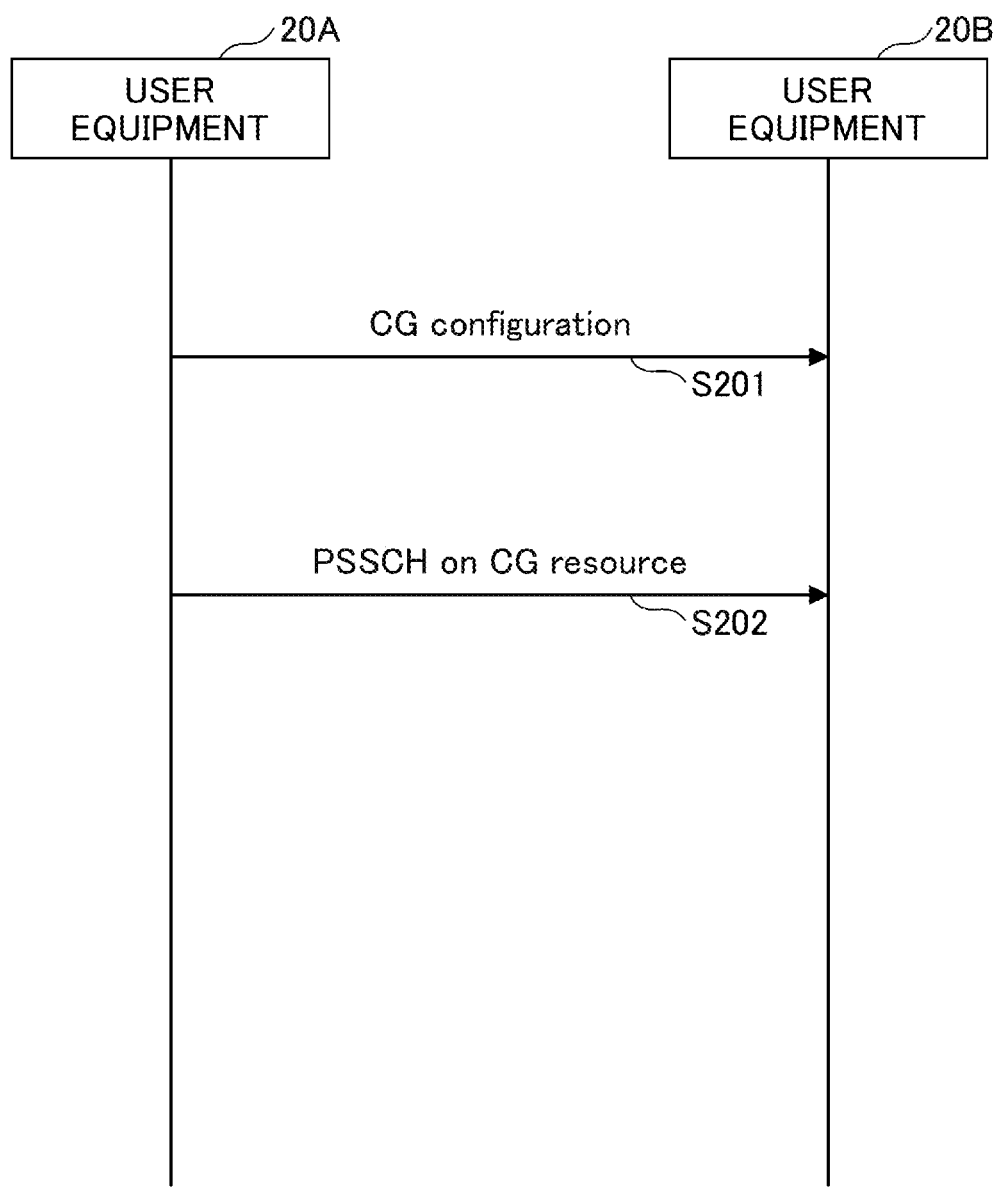
FIG. 8 is a sequence diagram for explaining an operation of Example 1-2.

FIG. 8 is a sequence diagram for explaining Example 1-2. In S201, for example, the user equipment 20A transmits configuration information of one or more CGs (CG configurations) to the user equipment 20B by RRC signaling (upper layer signaling) of PC5. The configuration information of each CG includes a parameter indicating a resource (time resource or time/frequency resource) and a periodicity (periodicity) used by the user equipment 20A in SL transmission.

The user equipment 20A can select a resource used in SL transmission in a manner that detects free resources by sensing, for example, as described in FIG. 3.

In S201, in the user equipment 20A that transmitted the PC5-RRC configuration of the one or more CGs and in the user equipment 20B that received the PC5-RRC configuration of the one or more CGs from the user equipment 20A, the one or more CGs are active. Accordingly, in S202, the user equipment 20A performs transmission of PSCCH/PSSCH using the resource of each CG, and the user equipment 20B can perform reception of the PSCCH/PSSCH with the resource.

Since the user equipment 20B has a CG configuration, the user equipment 20B can know a resource of data transmitted from the user equipment 20A. Therefore, data can be received by PSSCH without receiving SCI. That is, the user equipment 20A can perform transmission of only PSSCH without PSCCH (Standalone PSSCH transmission).

In Example 1-2, resources may overlap among multiple CGs configured by the user equipment 20A to the user equipment 20B.

For each of the user equipment 20A and the user equipment 20B, when the user equipment 20A or 20B detects overlapping of resources between the plurality of CGs as described above, the user equipment decides which CG resource to select according to its implementation (UE implementation).

For each of the user equipment 20A and the user equipment 20B, the user equipment 20A or 20B detects resource overlapping between the plurality of CGs as described above, the user equipment may select one resource according to a priority of CG. In this case, for example, configuration information of CGs transmitted from the user equipment 20A to the user equipment 20B includes information of priorities of the CGs. When CG2 has a higher priority than CG1, and when resources of CG1 and CG2 are overlapped, the user equipment 20A and the user equipment 20B each select, for example, a resource of the high priority CG2.

Example 2

Next, Example 2 will be described. Example 2 is an example in which multiple CGs of type 2 are configured to a user equipment 20. Example 2 is divided into Examples 2-1 and 2-2. Example 2-1 describes resource allocation mode 1, and Example 2-2 describes resource allocation mode 2.

Example 2-1: Resource Allocation Mode 1

Figure 9:
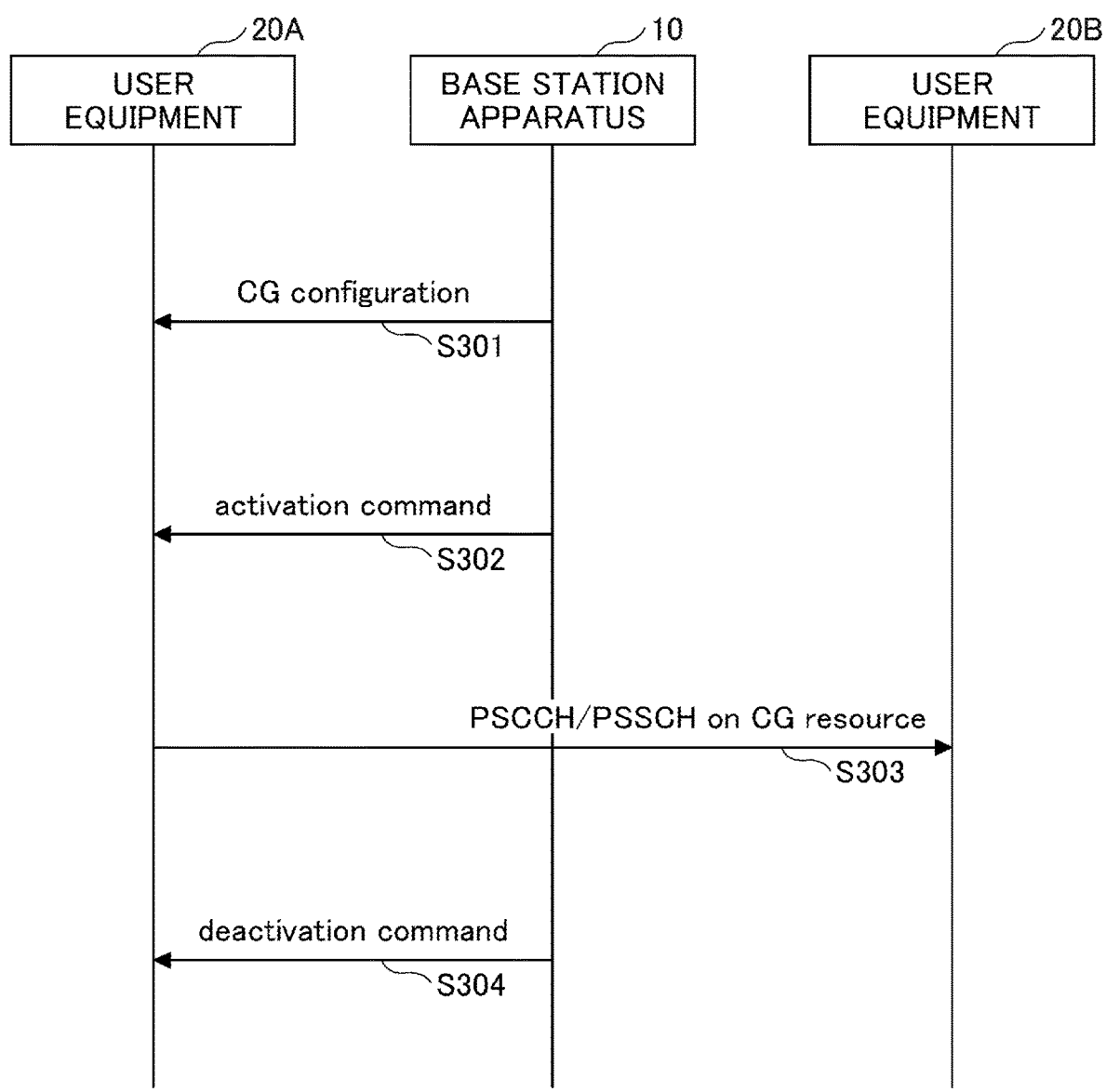
FIG. 9 is a sequence diagram for explaining an operation of Example 2-1.

FIG. 9 is a sequence diagram for explaining Example 2-1. In S301, for example, configuration information of one or more CGs (CG configurations) are transmitted from the base station apparatus 10 to the user equipment 20A by RRC signaling (upper layer signaling). The configuration information of each CG includes parameters indicating resources (time resources, or time and frequency resources) and a periodicity (periodicity) that the user equipment 20A can use in SL transmission.

In the user equipment 20A in which the RRC configuration of one or more CGs is performed by S301, the one or more CGs are inactive.

In S302, when the user equipment 20A receives an activation command for one or more CGs from the base station apparatus 10, the one or more CGs become active.

Accordingly, in S303, the user equipment 20A can perform transmission by PSCCH/PSSCH using the resources of each active CG.

In S304, when the user equipment 20A receives deactivation command for one or more CGs from the base station apparatus 10, the CG receiving deactivation command of the one or more CGs that was activated becomes inactive. PSCCH/PSSCH is not transmitted by the inactive CG resource.

The processing when resources are overlapped among the active CGs is the same as the processing described in Example 1-1.

Example 2-1: Details of Activation/Deactivation

A more detailed example of activation/deactivation of CG in Example 2-1 will be described below. "Activation command/deactivation command" will be used when explaining matters that apply to both activation and deactivation commands.

The activation command/deactivation command is notified, for example, by any one of the following signals: However, the following signals are exemplary, and the activation command/deactivation command may be notified by a signal other than those listed below.

DCI format;
Value of DCI field dedicated to activation command/ deactivation command;
RNTI that scrambles a CRC given to a DCI;
Special combination of values in existing DCI fields;
CORESET;
Search Space;
MAC-CE When the DCI format described above is used, it is possible, for example, to determine that if the user equipment 20A receives a DCI of DCI format A, it is an activation command, and if the user equipment 20A receives a DCI of DCI format B, it is a deactivation command.

Further, when using the RNTI, for example, it is possible to determine that if the user equipment 20A can decode the DCI with RNTI-A, it is an activation command, and if the user equipment 20A can decode the DCI with RNTI-B, it is a deactivation command.

When the CORESET or search space is used, for example, processing can be performed in which, for example, if the user equipment 20A receives a DCI in a CORESET (or search space), the user equipment 20A determines that it is an activation command, and if the user equipment 20A receives a DCI in another CORESET (or search space), the user equipment 20A determines that it is a deactivation command.

When MAC-CE is used, the activation command/deactivation command can be determined, for example, by a value of a bit in MAC-CE.

Also, which one of the plurality of CGs is activated or deactivated may be notified by any of the following signals. However, the following signals are exemplary and which of the plurality of CGs is activated or deactivated may be notified by a signal other than those below.

DCI format;
Value of DCI field dedicated to the activation command/ deactivation command;
RNTI that scrambles CRC given to the DCI;
Special combination of values in existing DCI fields;
CORESET;
Search Space;
MAC-CE The activation command/deactivation command may include information indicating which one of the multiple CGs is activated or deactivated.

Also, one activation command/one deactivation command for all configured CGs or for multiple CGs that are a part of all configured CGs may be notified, for example, by any of the following signals. However, the following signals are exemplary, and signals other than those listed below may be used.

DCI format;
Value of a DCI field dedicated to the activation command/ deactivation command;
RNTI that scrambles CRC given to the DCI;
Special combination of values in existing DCI fields;
CORESET;
Search Space;
MAC-CE Example 2-1: Concrete Example of Activation/Deactivation Notification For example, in a DCI, a DCI field is specified exclusively for the activation command/deactivation command as a 3-bit "CG type 2 configuration field". Each bit of 3 bits corresponds to a single CG configuration. In this case, for example, when the CG type 2 configuration field is 011, CG configuration 1 and CG configuration 2 are activated if they are inactive, and the CG configuration 0 is deactivated if it is active.

For example, each value represented by the above three bits may correspond to a certain configuration. In this case, for example, values=0, 1, 2, 3, 4, 5, 6, and 7 may be respectively associated with "deactivating all CG configurations, deactivating CG configuration 0, deactivating CG configuration 1, deactivating CG configuration 2, activating CG configuration 0, activating CG configuration 1, activating CG configuration 2, and activating all CG configurations." In this example, for example, when the CG type 2 configuration field is 011, the CG configuration 2 is deactivated if it is active. When CG type 2 configuration field=111, all CGs are activated if they are inactive.

The above-described contents described in Examples 2-1 may be applied to CG type 2 of NR-Uu.

In the example shown in FIG. 9, the configuration information transmitted to the user equipment 20A in S301, the activation command transmitted to the user equipment 20A in S302, and the deactivation command transmitted to the user equipment 20A in S304 may be also transmitted to the user equipment 20B, and the configuration information of one or more CGs for the user equipment 20A may be also configured to the user equipment 20B, and activation/deactivation may be performed.

Accordingly, the user equipment 20B can know a resource of data transmitted from the user equipment 20A, so that data can be received by PSSCH without receiving SCI. Accordingly, in this case, the user equipment 20A can perform transmission of only PSSCH without PSCCH (Standalone PSSCH transmission).

In the configuration shown in FIG. 9, the base station apparatus 10 may be replaced with a user equipment 20C. In this case, the user equipment 20C transmits configuration information of one or more CGs to the user equipment 20A by sidelink RRC signaling (PC5-RRC). For example, the activation command/deactivation command is sent using a SCI.

Example 2-2: Resource Allocation Mode 2

Figure 10:
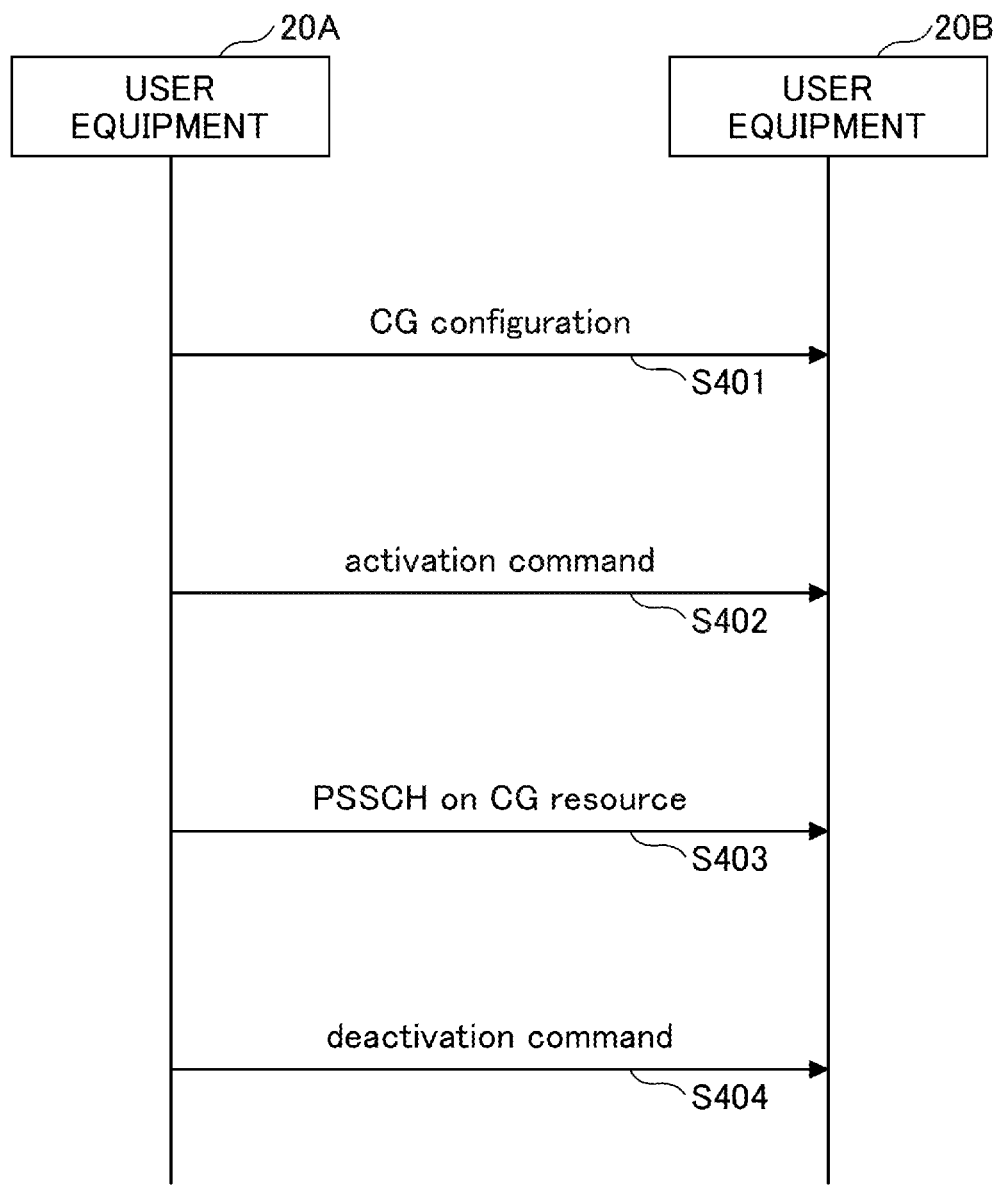
FIG. 10 is a sequence diagram for explaining an operation of Example 2-2.

FIG. 10 is a sequence diagram for explaining Example 2-2. In S401, for example, configuration information of one or more CGs (CG configurations) are transmitted from the user equipment 20A to the user equipment 20B by RRC signaling (upper layer signaling) of PC5. The configuration information of each CG includes a parameter indicating a resource (time resource or time/frequency resource) and a periodicity (periodicity) used by the user equipment 20A in SL transmission.

The user equipment 20A can select resources used in SL transmission in a manner that detects free resources by sensing, for example, as described in FIG. 3.

In S401, in the user equipment 20A that transmitted the PC5-RRC configuration of one or more CGs and in the user equipment 20B that received the PC5-RRC configuration of one or more CGs from the user equipment 20A, the one or more CGs are deactivated (inactive).

In S402, when the user equipment 20A transmits an activation command for one or more CGs to the user equipment 20B, in the user equipment 20A and the user equipment 20B, the one or more CGs become active.

Accordingly, in S403, the user equipment 20A can perform transmission by PSCCH/PSSCH using the resources of each active CG. Since the user equipment 20B has the CG configuration, the user equipment 20B can know a resource of data transmitted from the user equipment 20A. Therefore, data can be received by PSSCH without receiving SCI. That is, the user equipment 20A can perform transmission of only PSSCH without PSCCH (Standalone PSSCH transmission).

In S404, when the user equipment 20A transmits a deactivation command for one or more CGs to the user equipment 20B and the user equipment 20B receives the deactivation command, in the user equipment 20A and the user equipment 20B, the CG that is the target of the deactivation command is deactivated in the active one or more CGs. Transmission of PSCCH/PSSCH by a resource of inactivated CG is not performed.

The processing when resources overlap between the active CGs is the same as the processing described in Example 1-2.

Example 2-2: Details of Activation/Deactivation

A more detailed example of activation/deactivation of CG in Example 2-2 will be described below. "Activation command/deactivation command" will be used when explaining matters that apply to both activation and deactivation commands.

The activation command/deactivation command is notified, for example, by one of the following signals: However, the following signals are exemplary, and the activation command/deactivation command may be notified with signals other than those listed below.

SCI format;
Value of a SCI field dedicated to activation command/deactivation command;
RNTI that scrambles CRC added to SCI;
Special combination of values in existing SCI fields;
MAC-CE When the SCI format described above is used, for example, a process can be performed in which the user equipment 20B determines that, when receiving a SCI of SCI format A, it is an activation command, and when a SCI of SCI format B is received, it is a deactivation command.

Further, when using RNTI, for example, a process can be performed in which, when the user equipment 20B can decode SCI with RNTI-A, the user equipment 20B determines that it an activation command, and when the user equipment 20B can decode SCI with RNTI-B, the user equipment 20B determines that it a deactivation command.

When MAC-CE is used, the activation command/deactivation command can be determined, for example, by a value of a bit in the MAC-CE.

Also, which one of the plurality of CGs is activated or deactivated may be notified by any of the following signals. However, the following signals are exemplary and which of the plurality of CGs is activated or deactivated may be informed by signals other than those below.

SCI format;
Value of a SCI field dedicated to activation command/deactivation command;
RNTI that scrambles CRC added to SCI;
Special combination of values in existing SCI fields;
MAC-CE The activation command/deactivation command may also contain information indicating which one of the multiple CGs will be activated or deactivated.

Also, one activation command/one deactivation command for all configured CGs or for multiple CGs that are a part of all configured CGs may be notified, for example, by any of the following signals. However, the following signals are exemplary and one activation command/one deactivation command for all CGs or multiple CGs may be notified with signals other than the following signals.

SCI format;
Value of a SCI field dedicated to activation command/deactivation command;
RNTI that scrambles CRC added to SCI;
Special combination of values in existing SCI fields;
MAC-CE Example 2-2: Concrete Example of Activation/Deactivating Notification For example, in the SCI, a 3-bit "CG Type 2 Configuration Field" is defined as an SCI field dedicated to the activation command/deactivation command. For example, each bit corresponds to one CG configuration. In this case, for example, when the CG type 2 configuration field is 011, the CG configuration 1 and the CG configuration 2 are activated if they are inactive, and the CG configuration 0 is deactivated if this is active.

For example, each value represented by the above three bits may correspond to a certain configuration. In this case, for example, values=0, 1, 2, 3, 4, 5, 6, and 7 may be respectively associated with "deactivating all CG configurations, deactivating CG configuration 0, deactivating CG configuration 1, deactivating CG configuration 2, activating CG configuration 0, activating CG configuration 1, activating CG configuration 2, and activating all CG configurations." In each of the user equipment 20A and the user equipment 20B, for example, when the CG type 2 configuration field is 011, the CG configuration 2 is deactivated if it is active. When CG type 2 configuration field=111, all CGs are activated if they are inactive.

Examples 1 and 2 assume that multiple active CGs are supported in either Type 1 or Type 2, but multiple CGs may be applied to both Type 1 and Type 2. Alternatively, although only a single active CG is supported for each CG type, multiple active CGs may be realized by activating them simultaneously. For example, when type 1 CG1 is configured to the user equipment 20, type 2 CG2 and type 2 CG3 are configured, and an activation command is received for the CG2, a plurality of active CGs (CG1 and CG2) are realized in the user equipment 20. Here, when the resources of the different types of CGs are overlapped, the method described in Examples 1 and 2 can be applied (UE implementation, selection according to priority, etc.).

A plurality of active CGs can be used in SL in accordance with either of Example 1 and Example 2 described above.

(Apparatus Configuration)

Next, a functional configuration example of the base station apparatus 10 and the user equipment 20 that perform the processes and operations described above will be described. The base station apparatus 10 and the user equipment 20 include all the functions in the embodiments described above. However, each of the base station apparatus 10 and the user apparatus 20 may comprise only a part of the functions of all of the functions in the embodiment.

<Base Station Apparatus 10>

Figure 11:
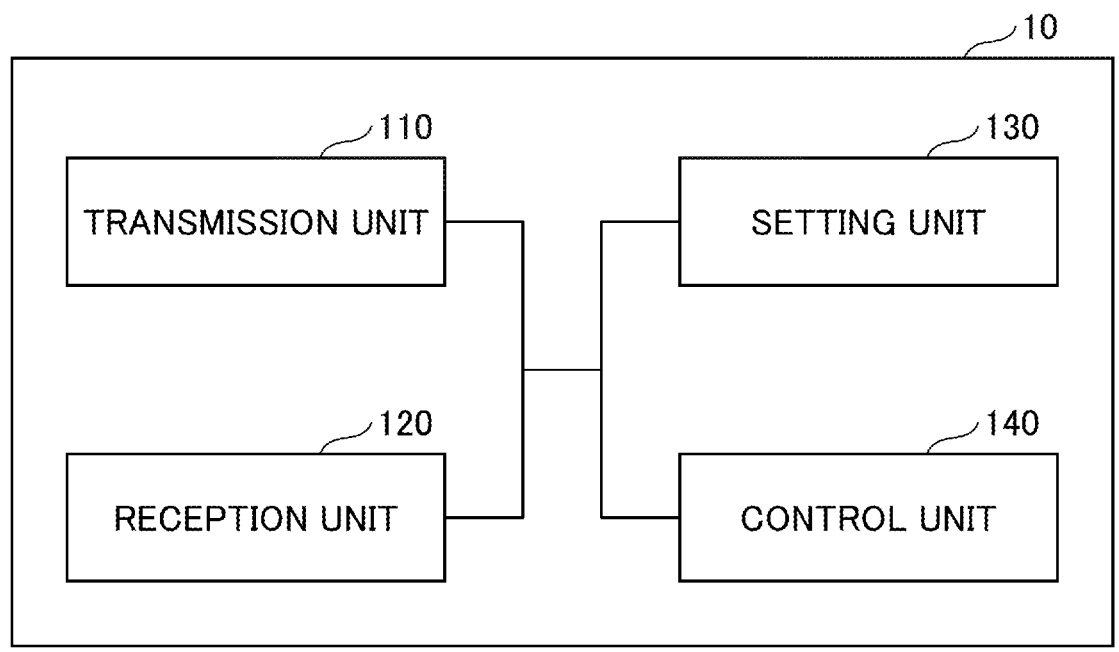
FIG. 11 shows an example of a functional configuration of the base station apparatus 10 according to an embodiment of the present invention.

FIG. 11 is a diagram illustrating an example of the functional configuration of the base station apparatus 10. As illustrated in FIG. 11, the base station apparatus 10 includes a transmitting unit 110, a receiving unit 120, a setting unit 130, and a control unit 140. The functional configuration illustrated in FIG. 11 is only an example. As long as the operation according to the embodiment of the invention can be performed, any functional division and any name of each functional unit may be applied.

The transmitting unit 110 has a function of generating a signal to be transmitted to the user equipment 20 and transmitting the signal wirelessly. The receiving unit 120 has a function of receiving various signals transmitted from the user equipment 20 and acquiring, for example, information of higher layers from the received signals. In addition, the transmitting unit 110 has a function of transmitting NR-PSS, NR-SSS, NR-PBCH, a DL/UL control signal, a DL reference signal, an RRC message, and the like to the user equipment 20.

The setting unit 130 stores configuration information set in advance and various configuration information to be transmitted to the user equipment 20 in a storage device provided in the setting unit 130, and reads out the configuration information from the storage device as necessary. The content of the configuration information is, for example, information regarding configuration of D2D communication. The control unit 140 controls the base station apparatus 10. A functional unit relevant to signal transmission in the control unit 140 may be included in the transmitting unit 110, and a functional unit relevant to signal reception in the control unit 140 may be included in the receiving unit 120.

<User Equipment 20>

Figure 12:
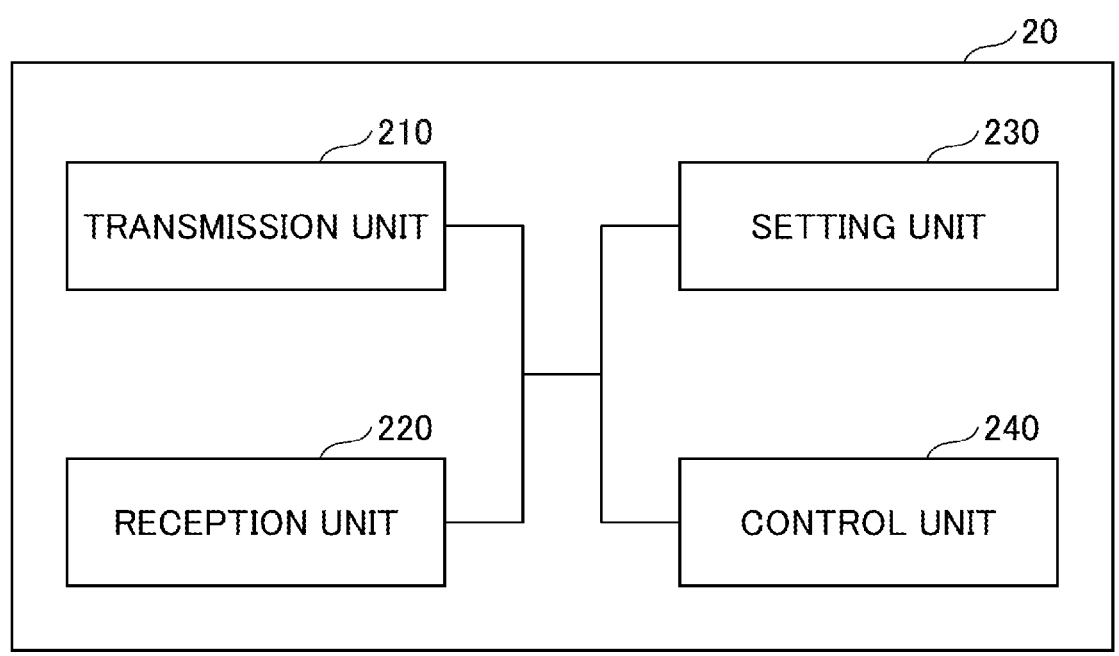
FIG. 12 is a diagram showing an example of a functional configuration of a user apparatus 20 according to an embodiment of the present invention.

FIG. 12 is a diagram illustrating an example of the functional configuration of the user equipment 20. As illustrated in FIG. 12, the user equipment 20 includes a transmitting unit 210, a receiving unit 220, a setting unit 230, and a control unit 240. The functional configuration illustrated in FIG. 12 is only an example. As long as the operation according to the embodiment of the invention can be performed, any functional division and any name of each functional unit may be applied.

The transmitting unit 210 generates a transmission signal from transmission data, and transmits the transmission signal wirelessly. The receiving unit 220 wirelessly receives various signals, and acquires a higher-layer signal from the received physical layer signal. In addition, the receiving unit 220 has a function of receiving NR-PSS, NR-SSS, NR-PBCH, a DL/UL/SL control signal, an RRC message, a reference signal, and the like transmitted from the base station apparatus 10. In addition, for example, the transmitting unit 210 transmits Physical Sidelink Control Channel (PSCCH), Physical Sidelink Shared Channel (PSSCH), Physical Sidelink Discovery Channel (PSDCH), Physical Sidelink Broadcast Channel (PSBCH), to another user equipment 20 as D2D communication, and the receiving unit 220 receives the PSCCH, the PSSCH, the PSDCH, the PSBCH, the PSFCH, and the like from another user equipment 20.

The setting unit 230 stores the various configuration information, which have been received from the base station apparatus 10 or the user equipment 20 by the receiving unit 220, in a storage device provided in the setting unit 230, and reads out the configuration information from the storage device as necessary. The setting unit 230 also stores the configuration information set in advance. The content of the configuration information is, for example, information regarding configuration of D2D communication. The control unit 240 controls the user equipment 20. A functional unit relevant to signal transmission in the control unit 240 may be included in the transmitting unit 210, and a functional unit relevant to signal reception in the control unit 240 may be included in the receiving unit 220.

<Hardware Configuration>

The block diagrams (FIGS. 11 and 12) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 13:
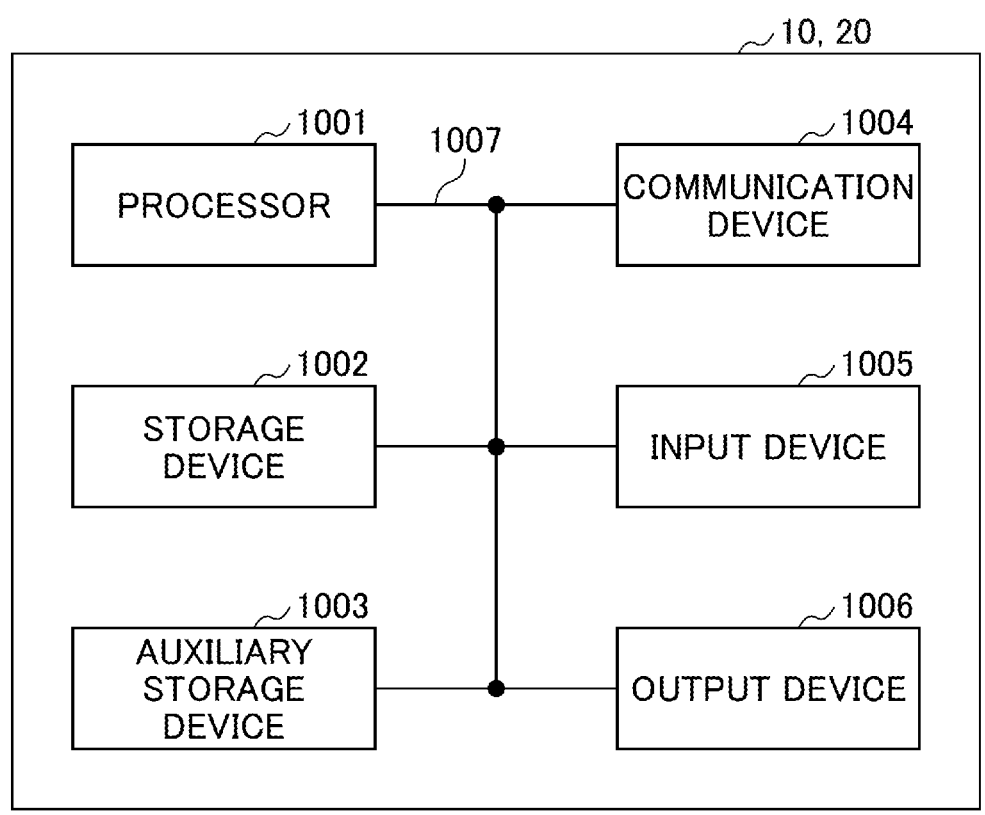
FIG. 13 is a diagram showing an example of a hardware configuration of a base station apparatus 10 or a user equipment 20 according to an embodiment of the present invention.

For example, the base station apparatus 10, the user equipment 20, and the like according to one embodiment of the present disclosure may function as a computer that performs processing of a wireless communication according to the present disclosure. FIG. 13 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 11, may be implemented by a control program that is stored in the storage device 1002 and that is executed by the processor 1001. Also, for example, the control unit 240 of the user equipment 20, as illustrated in FIG. 12, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiments

In this embodiment, at least user equipments described in the following items are provided.

Item 1

A user equipment including:
- a reception unit that receives configuration information for one or more grants from a base station apparatus; and
- a transmission unit that, wherein the one or more grants are active, transmits a sidelink signal using a resource specified by the one or more grants.

Item 2

A user equipment including:
- a transmission unit that transmits configuration information for one or more grants to another user equipment, wherein the one or more grants are active, and the transmission unit transmits a sidelink signal to the other user equipment using a resource specified by the one or more grants.

Item 3

A user equipment including:
a reception unit that receives configuration information for one or more grants from another user equipment, wherein the one or more grants are active, and the reception unit receives a sidelink signal using a resource specified by the one or more grants.

Item 4

A user equipment including: a reception unit that receives configuration information for one or more grants from a base station apparatus;
a control unit that, when the reception unit receives an activation command from the base station apparatus, activates all or a part of the one or more grants, and that, when the reception unit receives a deactivation command from the base station apparatus, deactivates all or a part of the one or more grants; and
a transmission unit that transmits a sidelink signal using a resource specified by the activated grant.

Item 5

A user equipment including:
a transmission unit that transmits configuration information for one or more grants to another user equipment; and
a control unit that, when the transmission unit transmits an activation command to the other user equipment, activates all or a part of the one or more grants, and that, when the transmission unit transmits a deactivation command to the other user equipment, deactivates all or a part of the one or more grants,
wherein the transmission unit transmits a sidelink signal using a resource specified by the activated grant.

Item 6

A user equipment including:
a reception unit that receives configuration information for one or more grants from another user equipment; and
a control unit that, when the reception unit receives an activation command from the other user equipment, activates all or a part of the one or more grants, and that, when the reception unit receives a deactivation command from the other user equipment, deactivates all or a part of the one or more grants,
wherein the reception unit receives a sidelink signal using a resource specified by the activated grant.

According to any the techniques in items 1 through 6, support for multiple active configured grants can be realized in sidelink.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the sidelink communication is an example of the direct communication between terminals. The SCI is an example of control information for direct communication between terminals. A slot is an example of a predetermined time domain interval.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

DESCRIPTION OF SYMBOLS

10 BASE STATION APPARATUS
110 TRANSMITTING UNIT
120 RECEIVING UNIT
130 SETTING UNIT
140 CONTROL UNIT
20 USER EQUIPMENT
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiver configured to receive, in downlink, configuration information of multiple configured grants in sidelink; and
a processor configured to activate or deactivate a configured grant of the multiple configured grants based on control information received in downlink,
wherein the control information includes a value of a field that designates the configured grant,
wherein the processor is configured to determine whether to activate or deactivate the configured grant based on a special combination of values in the control information,
wherein the special combination of values comprises a DCI field, and
wherein each value in the special combination of values is equal to 1 or 0, where 0 corresponds to activating the configured grant and 1 corresponds to deactivating the configured grant.

2. The terminal as claimed in claim 1, wherein a CRC of the control information is scrambled by a specific RNTI for control information used for activation or deactivation of a configured grant.

3. The terminal as claimed in claim 1, wherein the processor is configured to determine whether to activate or deactivate the configured grant based on a value of a special field in the control information.

4. A base station comprising:
a transmitter configured to transmit, in downlink, configuration information of multiple configured grants in sidelink; and
a processor configured to include a value of a field that designates a configured grant of the multiple configured grants into control information to be transmitted in downlink,
wherein the configured grant is activated or deactivated based on the control information in a terminal,
wherein whether to activate or deactivate the configured grant is determined based on a special combination of values in the control information,
wherein the special combination of values comprises a DCI field, and
wherein each value in the special combination of values is equal to 1 or 0, where 0 corresponds to activating the configured grant and 1 corresponds to deactivating the configured grant.

5. A system comprising:
a base station comprising:
 a transmitter configured to transmit, in downlink, configuration information of multiple configured grants in sidelink; and
a terminal comprising:
 a receiver configured to receive the configuration information in downlink; and
 a processor configured to activate or deactivate a configured grant of the multiple configured grants based on control information received in downlink,
wherein the control information includes a value of a field that designates the configured grant,
wherein the processor is configured to determine whether to activate or deactivate the configured grant based on a special combination of values in the control information,
wherein the special combination of values comprises a DCI field, and
wherein each value in the special combination of values is equal to 1 or 0, where 0 corresponds to activating the configured grant and 1 corresponds to deactivating the configured grant.

6. A communication method executed by a terminal, the method comprising:
receiving, in downlink, configuration information of multiple configured grants in sidelink; and
activating or deactivating a configured grant of the multiple configured grants based on control information received in downlink,
wherein the control information includes a value of a field that designates the configured grant,
wherein whether to activate or deactivate the configured grant is determined based on a special combination of values in the control information,
wherein the special combination of values comprises a DCI field, and
wherein each value in the special combination of values is equal to 1 or 0, where 0 corresponds to activating the configured grant and 1 corresponds to deactivating the configured grant.

* * * * *